(12) United States Patent
Beckward

(10) Patent No.: US 10,328,858 B1
(45) Date of Patent: Jun. 25, 2019

(54) VEHICLE SIDE VIEW MIRROR AIR AND INSECT DEFLECTOR

(71) Applicant: Eugene Beckward, Suwanee, GA (US)

(72) Inventor: Eugene Beckward, Suwanee, GA (US)

( * ) Notice: Subject to any disclaimer, the term of this patent is extended or adjusted under 35 U.S.C. 154(b) by 32 days.

(21) Appl. No.: 15/641,373

(22) Filed: Jul. 5, 2017

(51) Int. Cl.
*B60R 1/12* (2006.01)
*B60J 1/20* (2006.01)
*B60R 1/06* (2006.01)

(52) U.S. Cl.
CPC .............. *B60R 1/12* (2013.01); *B60J 1/2002* (2013.01); *B60R 1/06* (2013.01)

(58) Field of Classification Search
CPC .. B60J 1/2005; B60J 1/20; B60J 3/005; B60R 9/05; B60R 13/0861; B60R 11/06; B60R 13/01; B60R 13/04; B60R 19/023; B60R 19/12
USPC ........ 296/91, 180.1, 152, 97.5; 29/408, 428, 29/446, 89.3
See application file for complete search history.

(56) References Cited

U.S. PATENT DOCUMENTS

| | | | |
|---|---|---|---|
| 2,184,995 A | 12/1939 | Eriksen | |
| 2,649,839 A | 8/1953 | Condon | |
| D252,508 S | 7/1979 | Wiley, Jr. | |
| 4,750,824 A | 6/1988 | Soumenis | |
| 5,150,941 A * | 9/1992 | Silzer | B60J 1/2002 296/152 |
| 5,348,363 A | 9/1994 | Fink | |
| 5,421,623 A * | 6/1995 | Cassin | F16L 21/00 285/343 |
| D379,958 S | 6/1997 | Healy | |
| 5,899,520 A | 5/1999 | Bryant | |
| 7,232,175 B2 | 6/2007 | Yuan | |
| 7,530,625 B2 * | 5/2009 | Gulker | B60R 1/06 296/1.11 |
| 8,950,876 B2 * | 2/2015 | van Velthuizen | B60R 1/06 359/507 |
| 2012/0217767 A1 * | 8/2012 | Pennington | B60J 7/223 296/180.1 |

FOREIGN PATENT DOCUMENTS

EP 0005358 A1 11/1979

* cited by examiner

*Primary Examiner* — D Glenn Dayoan
*Assistant Examiner* — Sunsurraye Westbrook
(74) *Attorney, Agent, or Firm* — Kyle A. Fletcher, Esq.

(57) ABSTRACT

The vehicle side view mirror air and insect deflector is adapted for use with the side mirror of a vehicle. The vehicle side view mirror air and insect deflector is a structure that: 1) attaches to the side mirror of the vehicle; and, 2) deflects air as it passes the side mirror while the vehicle is in forward motion. The vehicle side view mirror air and insect deflector deflects air around the side mirror to: 1) deflect debris that would hit the side mirror; and, 2) to reduce the noise generated by the turbulence of the air passing the side mirror. The noise reduction generated vehicle side view mirror air and insect deflector is dynamic in nature. The vehicle side view mirror air and insect deflector comprises a trough and a deflector. The trough and deflector form a single unit. The trough attaches to the side mirror.

19 Claims, 4 Drawing Sheets

VEHICLE SIDE VIEW MIRROR AIR AND INSECT DEFLECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles in general including removable external protective covers specially adapted for vehicles, more specifically, a wind deflector adapted to prevent soiling.

SUMMARY OF INVENTION

The vehicle side view mirror air and insect deflector is adapted for use with a vehicle. The vehicle is further defined with a side mirror. Side mirrors are also commonly referred to a door mirrors or wing mirrors. The vehicle side view mirror air and insect deflector is a structure that: 1) attaches to the side mirror of the vehicle; and, 2) deflects air as it passes the side mirror while the vehicle is in forward motion. The vehicle side view mirror air and insect deflector deflects air around the side mirror to: 1) deflect organic and other road debris that would hit the side mirror; and, 2) to reduce the noise generated by the turbulence of the air passing the side mirror. The noise reduction generated vehicle side view mirror air and insect deflector is dynamic in nature. The vehicle side view mirror air and insect deflector comprises a trough and a deflector. The trough and deflector form a single unit. The trough attaches to the side mirror.

These together with additional objects, features and advantages of the vehicle side view mirror air and insect deflector will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle side view mirror air and insect deflector in detail, it is to be understood that the vehicle side view mirror air and insect deflector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle side view mirror air and insect deflector.

It is therefore important that the claims be regarded as including such equivalent construction insofar as they do not depart from the spirit and scope of the vehicle side view mirror air and insect deflector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
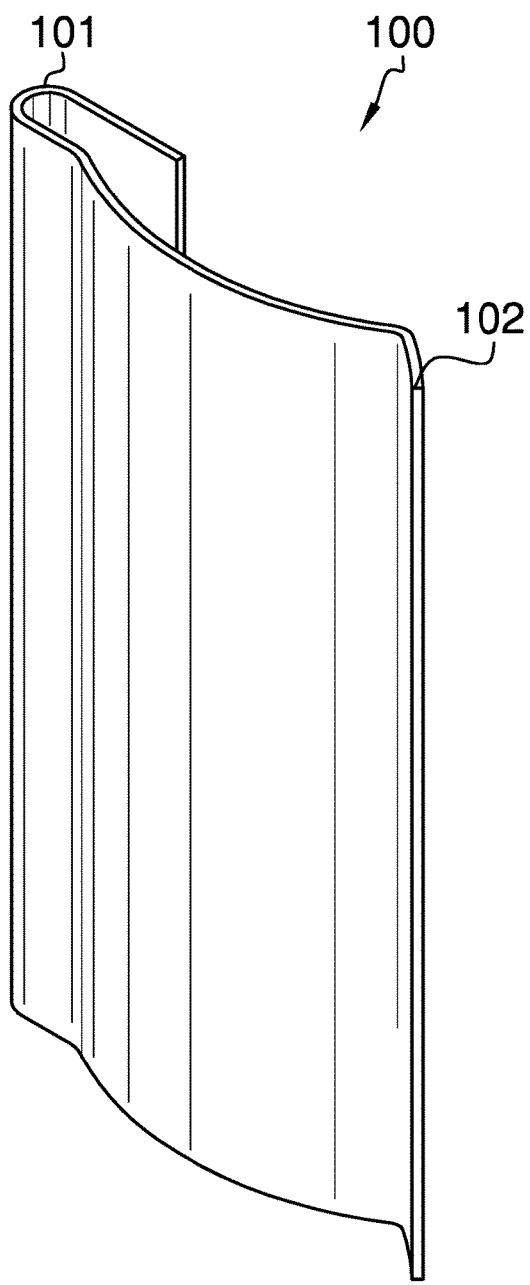
FIG. 1 is a perspective view of an embodiment of the disclosure.
Figure 2:
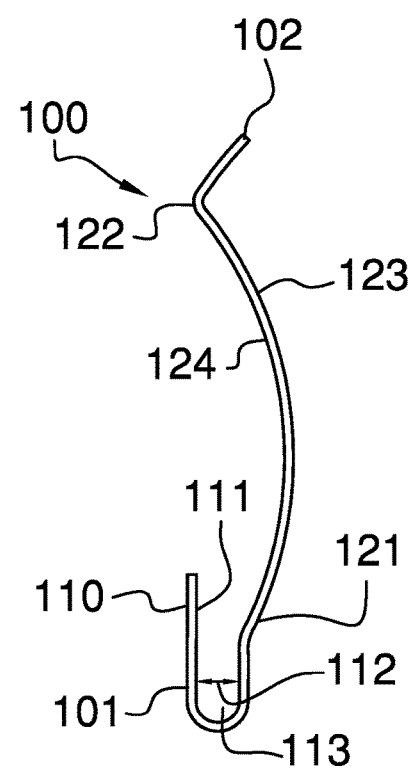
FIG. 2 is a top view of an embodiment of the disclosure.
Figure 3:
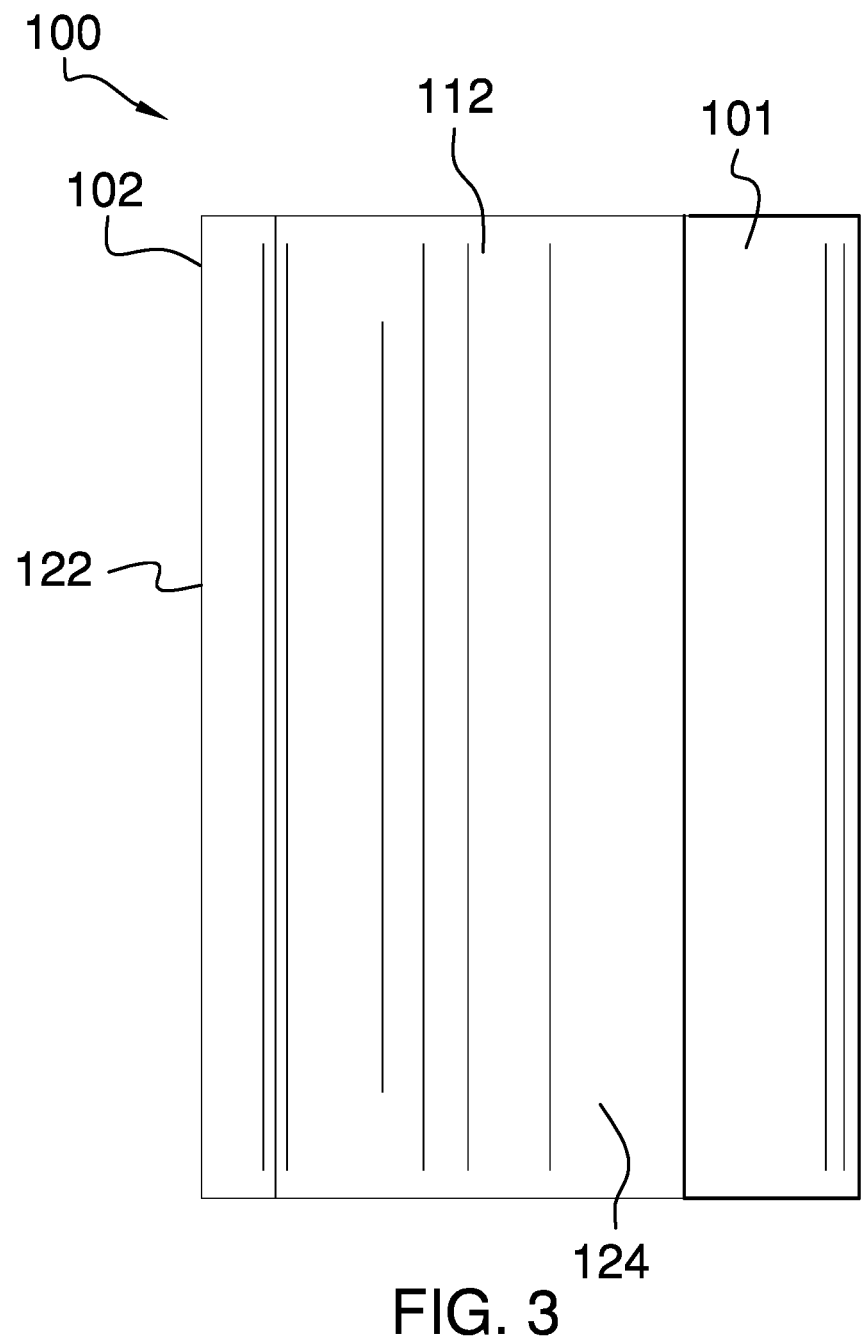
FIG. 3 is a back view of an embodiment of the disclosure.
Figure 4:
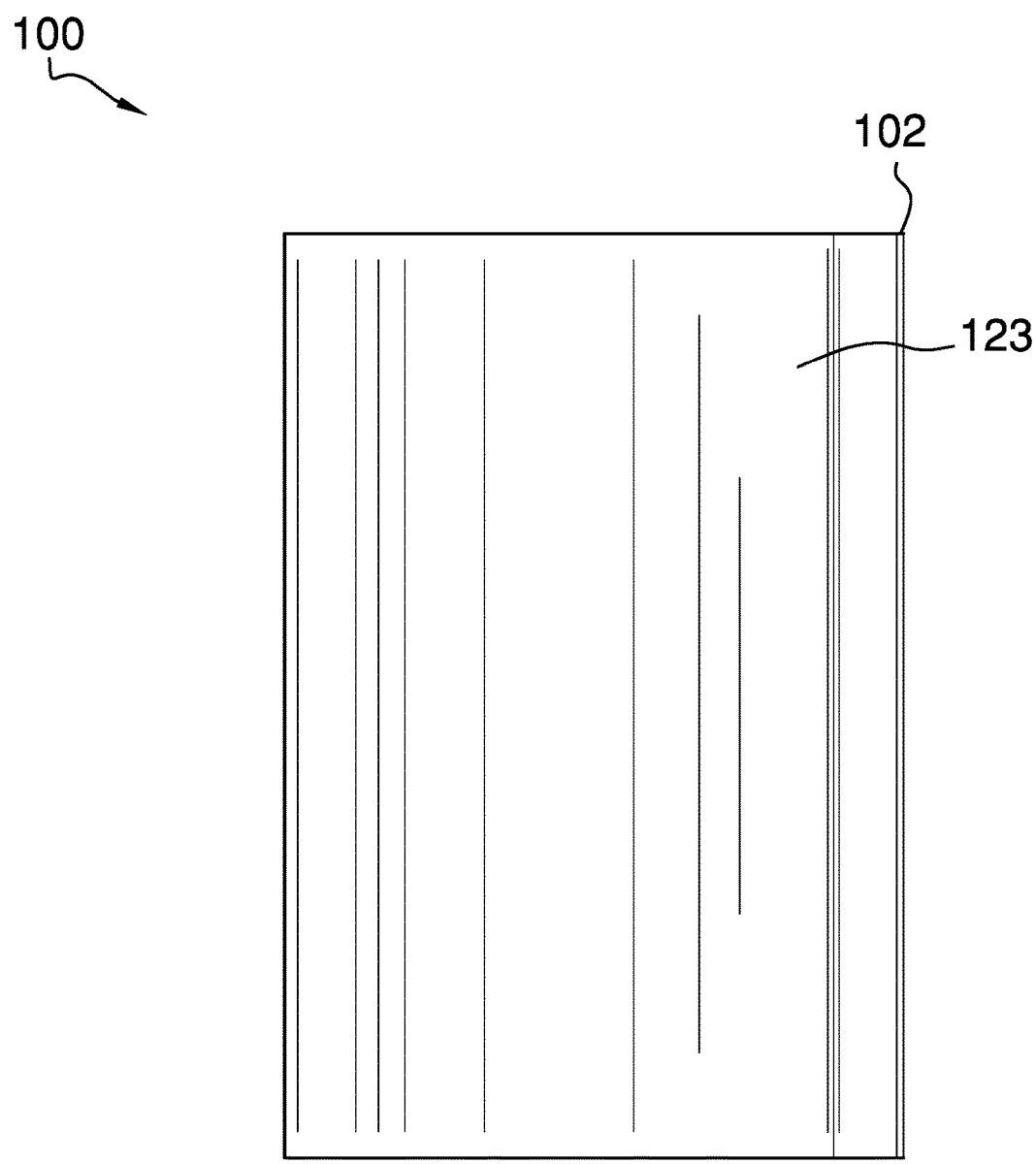
FIG. 4 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The vehicle side view mirror air and insect deflector 100 (hereinafter invention) is adapted for use with a vehicle 161. The vehicle 161 is further defined with a side mirror 162. The invention 100 is a structure that: 1) attaches to the side mirror 162 of the vehicle 161; and, 2) deflects the air flow 164 that passes the side mirror 162 while the vehicle 161 is in forward motion. The air flow 164 refers to the atmospheric gases that flow around the side mirror 162 and the invention 100 as the vehicle 161 is in motion. The invention 100 deflects air flow 164 around the side mirror 162 to: 1) deflect organic and other road debris that would hit the side mirror 162; and, 2) to reduce the noise generated by the turbulence of the air flow 164 passing the side mirror 162. The noise reduction generated invention 100 is dynamic in nature. The invention 100 comprises a trough 101 and a deflector 102. The trough 101 and deflector 102 form a single unit. The trough 101 attaches to the side mirror 162.

The side mirror 162 is a mirror that is mounted on the side of the vehicle 161 that allows a person to see behind the vehicle 161. Side mirrors 162 are also commonly referred to a door mirrors or wing mirrors. The side mirror 162 is further defined with a grip point 163. The grip point 163 is the location of the side mirror 162 to which the invention 100 is attached. It is preferred that the grip point 163 have a plate like structure.

The invention 100 is a semi-rigid structure that is formed as a single unit. The single unit of the invention 100 is functionally segmented into the trough 101 and the deflector 102. The semi-rigid structure of the invention 100 is elastic in nature. For purposes of clarity and simplicity, this disclosure will discuss the trough 101 and the deflector 102 as separate units even though the trough 101 and the deflector 102 are a single physical structure. Those skilled in the mechanical arts will recognize that this simplifying assumption will not in any way limit the operation of the invention 100 and should not be interpreted to in anyway way limit the scope of the claims.

The trough 101 is a clip that attaches the invention 100 to the side mirror 162 of the vehicle 161. The trough 101 is a trough 101 shaped structure. The inner span 112 of the trough 101 will increase when the grip point 163 of the side mirror 162 is inserted into the interior space 113 of the trough 101. As the trough 101 attempts to return to its relaxed shape, the first concave surface 111 of the trough 101 will apply pressure against the side mirror 162 which will secure the trough 101 to the side mirror 162. The trough 101 is further defined with a first convex surface 110, a first concave surface 111, and an inner span 112.

The first convex surface 110 is the exterior surface of the trough 101 shaped structure of the trough 101. The first concave surface 111 is the interior surface of the trough 101 shaped structure of the trough 101. The inner span 112 is the distance across the first concave surface 111 of the trough 101 into which the grip point 163 of the side mirror 162 is inserted. The interior space 113 is the physical space formed within the interior of the trough 101 that is bounded by the first concave surface 111. The inner span 112 is sized such that the inner span 112 will increase when the grip point 163 of the side mirror 162 is inserted into the interior space 113. The interior space 113 receives the grip point 163 of the side mirror 162.

The deflector 102 is a curved structure that is use to deflect the air flow 164 around the side mirror 162. As shown most clearly in FIG. 2, the curved structure of the deflector 102 forms an arcuate. The deflector 102 is attached to the trough 101 in the manner of a cantilever. The deflector 102 is further defined with a fixed end 121, a free end 122, a second convex surface 123, and a second concave surface 124. The fixed end 121 is the edge of the deflector 102 that is attached to the trough 101. The free end 122 is the edge of the deflector 102 that is distal from the fixed end 121. The second convex surface 123 is the surface of the deflector 102 that faces the air flow 164. The second concave surface 124 is the surface of the deflector 102 that is distal from the second convex surface 123.

The arcuate shape in conjunction with the cantilever mounting causes the deflector 102 to act as a spring. Specifically, when the air flow 164 strikes the convex surface 123 of the deflector 102 the elasticity of the deflector 102 creates a rotational torque that displaces the deflector 102. This rotation is opposed by internal stresses within the structure of the deflector 102 that attempt to return the deflector 102 to its relaxed shape. The force applied to the deflector 102 increases as function of the square of the speed of the air flow 164. This means that the measured amount of angular rotation created within the deflector 102 by the air flow 164 varies with the speed of the air flow 164. This relationship between the speed of the air flow 164 and the measured angular rotation of the deflector 102 is used to dynamically adjust the deflection of the air flow 164 to minimize turbulence created within the air flow 164 as the air flow 164 passes the invention 100.

The dynamic noise reduction created by the invention 100 operates as described in this paragraph. As the vehicle 161 initially speeds up, the deflector 102 simply deflects the air flow 164 around the side mirror 162 such that the air flow 164 smoothly passes around the turbulence creating elements of the side mirror 162 thereby reducing the road noise created by the side mirror 162. In this initial state, the deflector 102 is relatively perpendicular to the air flow 164 thereby insuring that the air flow 164 will pass widely around the side mirror the deflector 102 would begin to generate its own secondary turbulence within the air flow 164 which would create additional road noise. The invention 100 is designed to reduce this potential secondary turbulence by using the increased force of the air flow 164 created by the increased speed to bend the deflector 102 more closely to the side mirror 162. This closer fit: 1) positions the deflector 102 at an angle less perpendicular to the air flow 164; and, 2) side slips the air flow 164 past the side mirror 162 to ensure that the air flow 164 continues to avoid the side mirror 162 thereby avoiding the subsequent creation of primary turbulence by the side mirror 162.

The invention 100 is attached to the side mirror 162 in such a manner that the second convex surface 123 of the deflector 102 faces the air flow 164 during normal use and forward motion of the vehicle 161.

Figure 5:
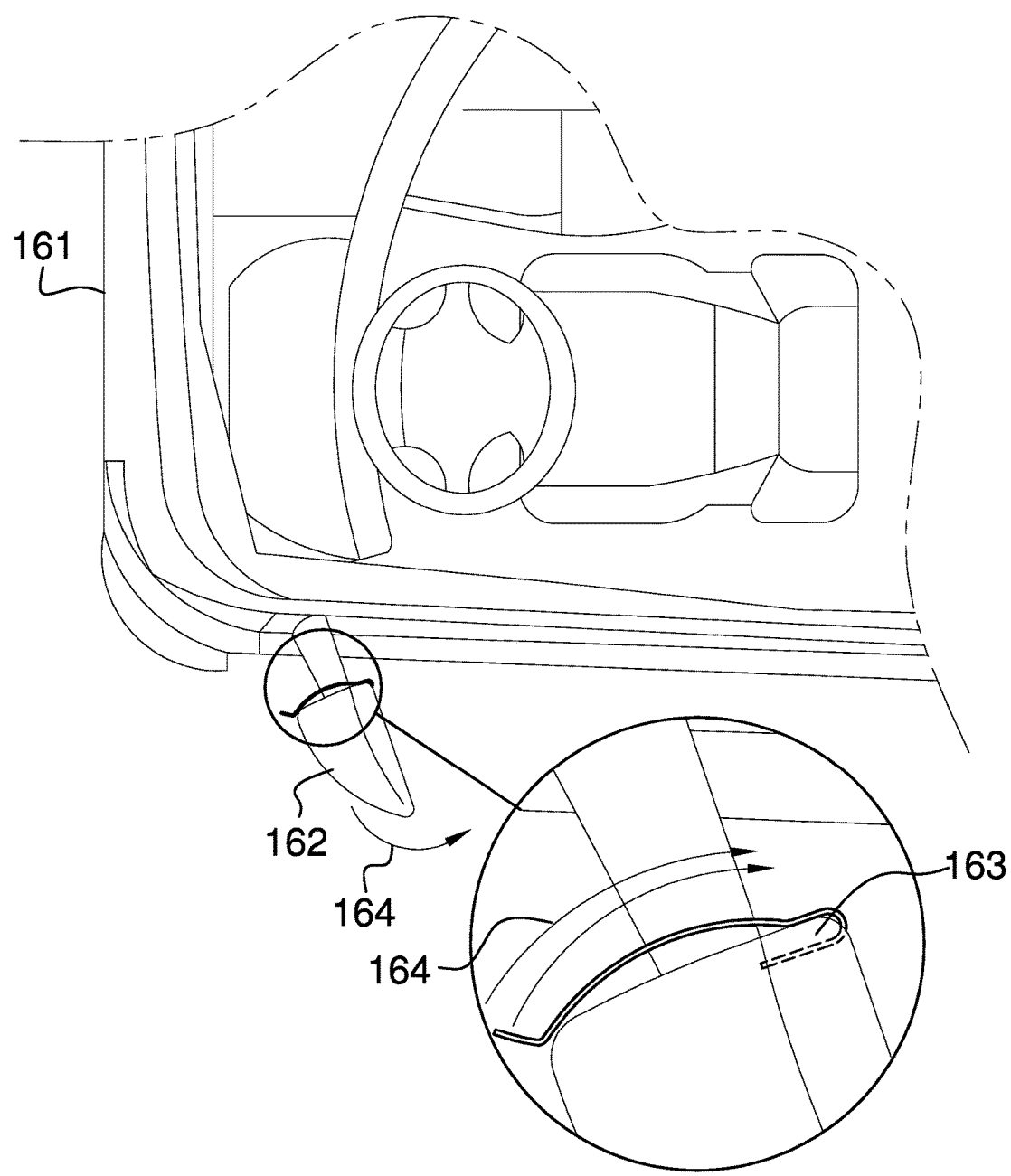
FIG. 5 is an in use view of an embodiment of the disclosure.

As shown most clearly in FIG. 5, the invention 100 is used as described in this paragraph. The grip point 163 of the side mirror 162 is inserted into the interior space 113 of the trough 101 such that: 1) the inner span 112 of the trough 101 increases; and, 2) the second convex surface 123 of the deflector 102 faces the expected direction of the air flow 164 which is assumed to be the front end of the vehicle 161. The side mirror 162 is then used normally.

The following definitions were used in this disclosure:

Arcuate: As used in this disclosure, arcuate describes the curve formed by a bent bow.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Exterior: As used in this disclosure, the exterior is use as a relational term that implies that an object is not contained within the boundary of a structure or a space.

Interior: As used in this disclosure, the interior is use as a relational term that implies that an object is contained within the boundary of a structure or a space.

Negative Space: As used in this disclosure, negative space is a method of defining an object through the use of open or empty space as the definition of the object itself, or, through the use of open or empty space to describe the boundaries of an object.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Torsion Spring: As used in this disclosure, a torsion spring is a mechanical device that stores mechanical energy through an opposing torque when the mechanical device is twisted. The torsion spring will return to its original position when the twisting force is removed.

Vehicle: As used in this disclosure, a vehicle is a motorized device that is used transporting carrying passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wind deflector comprising:
wherein the wind deflector comprises a trough and a deflector;
wherein the wind deflector is configured for use with a vehicle;
wherein the vehicle is further defined with a side mirror;
wherein the wind deflector attaches to the side mirror of the vehicle;
wherein the wind deflector deflects the air flow around the side mirror while the vehicle is in forward motion;
wherein the wind deflector reduces the noise generated by the turbulence of the air flow passing the side mirror;
wherein the noise reduction generated wind deflector is dynamic;
wherein the trough attaches to the side mirror;
wherein the side mirror is further defined with a grip point;
wherein the deflector is a curved structure;
wherein the curved structure of the deflector forms an arcuate.

2. The wind deflector according to claim 1
wherein the wind deflector is a semi-rigid structure that is formed as a single unit;
wherein the single unit of the wind deflector is functionally segmented into the trough and the deflector;
wherein the semi-rigid structure of the wind deflector is elastic in nature.

3. The wind deflector according to claim 2 wherein the trough is a clip that attaches the wind deflector to the grip point of the side mirror of the vehicle.

4. The wind deflector according to claim 3
wherein the trough is a trough shaped structure;
wherein the trough is further defined with a first convex surface, a first concave surface, an inner span, and an interior space;
wherein the interior space receives the grip point of the side mirror.

5. The wind deflector according to claim 4
wherein the inner span is sized such that the inner span will increase when the grip point of the side mirror is inserted into the interior space;
wherein the inner span of the trough will increase when the grip point of the side mirror is inserted into the interior space of the trough;
wherein the first concave surface of the trough applies pressure against the grip point.

6. The wind deflector according to claim 5
wherein the deflector is a curved structure;
wherein the curved structure of the deflector forms an arcuate.

7. The wind deflector according to claim 6
wherein the deflector is attached to the trough in the manner of a cantilever;
wherein the deflector is further defined with a fixed end, a free end, a second convex surface, and a second concave surface;
wherein the fixed end is the edge of the deflector that is attached to the trough;
wherein the free end is the edge of the deflector that is distal from the fixed end;
wherein the second convex surface is the surface of the deflector that faces the air flow;
wherein the second concave surface is the surface of the deflector that is distal from the second convex surface.

8. The wind deflector according to claim 7 wherein the arcuate shape in conjunction with the cantilever mounting causes the deflector to act as a spring.

9. The wind deflector according to claim 8
wherein the air flow strikes the convex surface of the deflector to create a rotational torque that displaces the deflector;
wherein this rotation is opposed by internal stresses within the structure of the deflector;
wherein the displacement of the deflector is measured as an angular rotation.

10. The wind deflector according to claim 9 herein the angular rotation created within the deflector by the air flow varies with the speed of the air flow.

11. The wind deflector according to claim 10 wherein the wind deflector is designed such that the relationship between the speed of the air flow and the angular rotation of the deflector dynamically minimizes the turbulence created within the air flow as the air flow passes the wind deflector and the side mirror.

12. The wind deflector according to claim 11 wherein the wind deflector is attached to the side mirror in such a manner that the second convex surface of the deflector faces the air flow during forward motion of the vehicle.

13. The wind deflector according to claim 1
wherein the deflector is attached to the trough in the manner of a cantilever;
wherein the deflector is further defined with a fixed end, a free end, a second convex surface, and a second concave surface;
wherein the fixed end is the edge of the deflector that is attached to the trough;
wherein the free end is the edge of the deflector that is distal from the fixed end;

wherein the second convex surface is the surface of the deflector that faces the air flow;

wherein the second concave surface is the surface of the deflector that is distal from the second convex surface.

14. The wind deflector according to claim 13 wherein the arcuate shape in conjunction with the cantilever mounting causes the deflector to act as a spring.

15. The wind deflector according to claim 14 wherein the air flow strikes the convex surface of the deflector to create a rotational torque that displaces the deflector;

wherein this rotation is opposed by internal stresses within the structure of the deflector;

wherein the displacement of the deflector is measured as an angular rotation;

wherein the angular rotation created within the deflector by the air flow varies with the speed of the air flow.

16. The wind deflector according to claim 15 wherein the wind deflector is designed such that the relationship between the speed of the air flow and the angular rotation of the deflector dynamically minimizes the turbulence created within the air flow as the air flow passes the wind deflector and the side mirror.

17. The wind deflector according to claim 16 wherein the wind deflector is attached to the side mirror in such a manner that the second convex surface of the deflector faces the air flow during forward motion of the vehicle.

18. The wind deflector according to claim 17 wherein the wind deflector is a semi-rigid structure that is formed as a single unit;

wherein the single unit of the wind deflector is functionally segmented into the trough and the deflector;

wherein the semi-rigid structure of the wind deflector is elastic in nature.

19. The wind deflector according to claim 18 wherein the trough is a trough shaped structure;

wherein the trough is further defined with a first convex surface, a first concave surface, an inner span, and an interior space;

wherein the interior space receives the grip point of the side mirror;

wherein the inner span is sized such that the inner span will increase when the grip point of the side mirror is inserted into the interior space;

wherein the inner span of the trough will increase when the grip point of the side mirror is inserted into the interior space of the trough;

wherein the first concave surface of the trough applies pressure against the grip point.

* * * * *